(12) United States Patent
Roweth et al.

(10) Patent No.: US 12,294,514 B2
(45) Date of Patent: May 6, 2025

(54) SYSTEM AND METHOD FOR FACILITATING OPERATION MANAGEMENT IN A NETWORK INTERFACE CONTROLLER (NIC) FOR ACCELERATORS

(71) Applicant: Hewlett Packard Enterprise Development LP, Spring, TX (US)

(72) Inventors: Duncan Roweth, Bristol (GB); Andrew S. Kopser, Seattle, WA (US); Igor Gorodetsky, Coquitlam (CA); Laurence Scott Kaplan, Shoreline, WA (US); Krishna Chaitanya Kandalla, St. Paul, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/544,791

(22) Filed: Dec. 19, 2023

(65) Prior Publication Data
US 2024/0121180 A1   Apr. 11, 2024

Related U.S. Application Data

(63) Continuation of application No. 17/594,627, filed as application No. PCT/US2020/024257 on Mar. 23, 2020, now Pat. No. 11,876,701.
(Continued)

(51) Int. Cl.
*H04L 45/28* (2022.01)
*G06F 9/50* (2006.01)
(Continued)

(52) U.S. Cl.
CPC .............. *H04L 45/28* (2013.01); *G06F 9/505* (2013.01); *G06F 9/546* (2013.01);
(Continued)

(58) Field of Classification Search
CPC ....... H04L 45/28; H04L 45/02; H04L 45/021; H04L 45/028; H04L 45/122;
(Continued)

(56) References Cited

U.S. PATENT DOCUMENTS 10,719,445 B1 *   7/2020   Navon ................ G06F 12/0868
2017/0237672 A1   8/2017   Dalal
(Continued)

*Primary Examiner* — Henry Tsai
*Assistant Examiner* — Aurangzeb Hassan
(74) *Attorney, Agent, or Firm* — Yao Legal Services, Inc.

(57) ABSTRACT

A network interface controller (NIC) capable of efficient operation management for host accelerators is provided. The NIC can be equipped with a host interface and triggering logic block. During operation, the host interface can couple the NIC to a host device. The triggering logic block can obtain, via the host interface from the host device, an operation associated with an accelerator of the host device. The triggering logic block can determine whether a triggering condition has been satisfied for the operation based on an indicator received from the accelerator. If the triggering condition has been satisfied, the triggering logic block can obtain a piece of data generated from the accelerator from a memory location and execute the operation using the piece of data.

18 Claims, 8 Drawing Sheets

Related U.S. Application Data

(60) Provisional application No. 62/852,203, filed on May 23, 2019, provisional application No. 62/852,289, filed on May 23, 2019, provisional application No. 62/852,273, filed on May 23, 2019.

(51) Int. Cl.

| | | |
|---|---|---|
| *G06F 9/54* | (2006.01) | |
| *G06F 12/0862* | (2016.01) | |
| *G06F 12/1036* | (2016.01) | |
| *G06F 12/1045* | (2016.01) | |
| *G06F 13/14* | (2006.01) | |
| *G06F 13/16* | (2006.01) | |
| *G06F 13/28* | (2006.01) | |
| *G06F 13/38* | (2006.01) | |
| *G06F 13/40* | (2006.01) | |
| *G06F 13/42* | (2006.01) | |
| *G06F 15/173* | (2006.01) | |
| *H04L 1/00* | (2006.01) | |
| *H04L 43/0876* | (2022.01) | |
| *H04L 43/10* | (2022.01) | |
| *H04L 45/00* | (2022.01) | |
| *H04L 45/02* | (2022.01) | |
| *H04L 45/021* | (2022.01) | |
| *H04L 45/028* | (2022.01) | |
| *H04L 45/12* | (2022.01) | |
| *H04L 45/122* | (2022.01) | |
| *H04L 45/125* | (2022.01) | |
| *H04L 45/16* | (2022.01) | |
| *H04L 45/24* | (2022.01) | |
| *H04L 45/42* | (2022.01) | |
| *H04L 45/745* | (2022.01) | |
| *H04L 45/7453* | (2022.01) | |
| *H04L 47/10* | (2022.01) | |
| *H04L 47/11* | (2022.01) | |
| *H04L 47/12* | (2022.01) | |
| *H04L 47/122* | (2022.01) | |
| *H04L 47/20* | (2022.01) | |
| *H04L 47/22* | (2022.01) | |
| *H04L 47/24* | (2022.01) | |
| *H04L 47/2441* | (2022.01) | |
| *H04L 47/2466* | (2022.01) | |
| *H04L 47/2483* | (2022.01) | |
| *H04L 47/30* | (2022.01) | |
| *H04L 47/32* | (2022.01) | |
| *H04L 47/34* | (2022.01) | |
| *H04L 47/52* | (2022.01) | |
| *H04L 47/62* | (2022.01) | |
| *H04L 47/625* | (2022.01) | |
| *H04L 47/6275* | (2022.01) | |
| *H04L 47/629* | (2022.01) | |
| *H04L 47/76* | (2022.01) | |
| *H04L 47/762* | (2022.01) | |
| *H04L 47/78* | (2022.01) | |
| *H04L 47/80* | (2022.01) | |
| *H04L 49/00* | (2022.01) | |
| *H04L 49/101* | (2022.01) | |
| *H04L 49/15* | (2022.01) | |
| *H04L 49/90* | (2022.01) | |
| *H04L 49/9005* | (2022.01) | |
| *H04L 49/9047* | (2022.01) | |
| *H04L 67/1097* | (2022.01) | |
| *H04L 69/22* | (2022.01) | |
| *H04L 69/40* | (2022.01) | |
| *H04L 69/28* | (2022.01) | |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(58) Field of Classification Search
CPC ..... H04L 45/123; H04L 45/125; H04L 45/16; H04L 45/20; H04L 45/22; H04L 45/24; H04L 45/38; H04L 45/42; H04L 45/46; H04L 45/566; H04L 45/70; H04L 45/745; H04L 45/7453; H04L 1/0083; H04L 43/0876; H04L 43/10; H04L 43/021; H04L 43/028; H04L 43/122; H04L 43/123; H04L 43/125; H04L 43/16; H04L 43/20; H04L 43/22; H04L 43/24; H04L 43/38; H04L 43/42; H04L 43/46; H04L 43/566; H04L 43/70; H04L 43/745; H04L 43/7453; H04L 47/11; H04L 47/12; H04L 47/122; H04L 47/18; H04L 47/20; H04L 47/22; H04L 47/24; H04L 47/2241; H04L 47/2466; H04L 47/2483; H04L 47/30; H04L 47/323; H04L 47/34; H04L 47/39; H04L 47/52; H04L 47/621; H04L 47/6235; H04L 47/626; H04L 47/6275;

H04L 47/629; H04L 47/76; H04L 47/762;
H04L 47/781; H04L 47/80; H04L 49/101;
H04L 49/15; H04L 49/30; H04L 49/3009;
H04L 49/3018; H04L 49/3027; H04L
49/90; H04L 49/9005; H04L 49/9021;
H04L 49/9036; H04L 49/9047; H04L
69/22; H04L 69/40; H04L 69/28; G06F
9/505; G06F 9/546; G06F 12/0862; G06F
12/1036; G06F 12/1063; G06F 13/14;
G06F 13/16; G06F 13/1642; G06F
13/1673; G06F 13/1689; G06F 13/385;
G06F 13/4022; G06F 13/4068; G06F
13/4221; G06F 15/17331; G06F 2212/50;
G06F 2213/0026; G06F 2213/3808

See application file for complete search history.

(56) References Cited

U.S. PATENT DOCUMENTS

| | | |
|---|---|---|
| 2019/0042335 A1 | 2/2019 | Flajslik et al. |
| 2019/0042337 A1 | 2/2019 | Dinan et al. |
| 2020/0034061 A1* | 1/2020 | Khalili .................. G06F 3/0659 |
| 2022/0350744 A1* | 11/2022 | Urrinkala ............ G06F 12/0862 |

* cited by examiner

SYSTEM AND METHOD FOR FACILITATING OPERATION MANAGEMENT IN A NETWORK INTERFACE CONTROLLER (NIC) FOR ACCELERATORS

CROSS REFERENCE TO RELATED APPLICATIONS

This application is a continuation of U.S. patent application Ser. No. 17/594,627, filed on Oct. 25, 2021, which application is a national stage of International Application No. PCT/US2020/024257, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,289 filed May 23, 2019. The disclosures of the aforementioned applications are hereby incorporated by reference in their entireties.

BACKGROUND

Field

This is generally related to the technical field of networking. More specifically, this disclosure is related to systems and methods for facilitating a network interface controller (NIC) with efficient operation management for host accelerators.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (TOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficient operation management for host accelerators is provided. The NIC can be equipped with a host interface and triggering logic block. During operation, the host interface can couple the NIC to a host device. The triggering logic block can obtain, via the host interface from the host device, an operation associated with an accelerator of the host device. The triggering logic block can determine whether a triggering condition has been satisfied for the operation based on an indicator received from the accelerator. If the triggering condition has been satisfied, the triggering logic block can obtain a piece of data generated from the accelerator from a memory location and execute the operation using the piece of data.

BRIEF DESCRIPTION OF THE FIGURES

In the figures, like reference numerals refer to the same figure elements.

DETAILED DESCRIPTION

Figure 1:
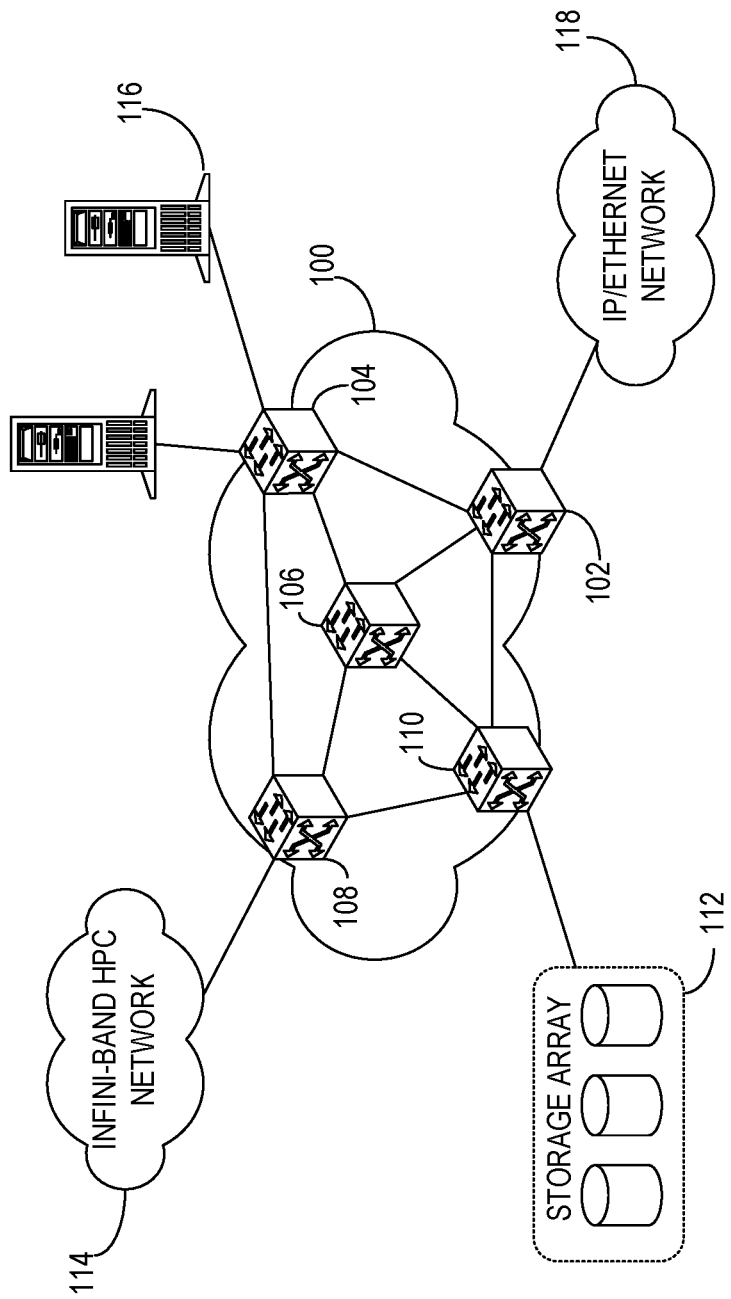
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate operation management in a network interface controller (NIC) for host accelerators. The NIC allows a host to communicate with a data-driven network.

The embodiments described herein solve the problem of facilitating efficient communication operations for an accelerator by (i) generating communication operations for the accelerator by the host processor, and (ii) providing the communication operations to the NIC and allowing the accelerator to trigger the operations at the NIC. In this way, the accelerator can communicate without implementing a protocol stack.

During operation, an application, which can operate on a host device of a NIC, can issue a command that involves significant and complex computations. The host device may use an accelerator, such as a graphic processing unit (GPU) or a tensor processing unit (TPU), to efficiently perform such computations. However, an accelerator may facilitate scalar computing, which may not be well suited for running a communication stack. Furthermore, facilitating the computational results to the host processor (e.g., the central processor of the host device) can be time-consuming. As a result, issuing communication operations from the accelerator may be inefficient and cause a delay in providing the computational results to remote devices.

To solve this problem, the NIC can store communication operations generated by the host processor and allow the accelerator to trigger the operation at the NIC. During operation, the host processor may prepare a communication operation in advance and store the operations in a command queue, which can be stored in the memory device of the host device. Upon completion of a set of computations, the accelerator may store the result or outcome of the computations in a predetermined location. The location can be in the memory device of the host device or a memory device of the NIC.

The NIC may pre-fetch the operation and store the operation in a pre-fetch queue of the NIC. The accelerator can then trigger the operation by notifying the NIC. In response, the NIC may obtain the communication operation from the command queue or the pre-fetch queue of the NIC. The NIC can also obtain the result from the predetermined location. Subsequently, the NIC can issue the communication operation with the result as payload or parameter. In some embodiments, the communication operation is a remote direct memory access (RDMA) operation, such as a "GET" or a "PUT" command. In this way, the NIC can facilitate efficient communication operations for the accelerator without requiring the accelerator to implement a communication stack.

Since the communication operation is a pre-generated operation that can be triggered, such an operation can be referred to as a triggered operation. The NIC may facilitate a triggered operation based on a counting event. The NIC can maintain a counter (e.g., a hardware-implemented counter) and a threshold value for the counting event. An interface-based command may cause the NIC to increment the counter. For example, the accelerator may execute a plurality of threads or processes. When a thread or process completes the allocated computation, the thread or process can issue the interface-based command to the NIC.

The interface-based command can include a handle (e.g., a pointer or an identifier) of the counter. Upon receiving the command, the NIC can increment the counter. When the counter value becomes greater than or equal to the threshold, the NIC can determine that a triggering condition has been satisfied. Accordingly, the NIC can trigger the communication operation. Here, the threshold can correspond to the number of threads (or processes). In this way, each thread or process can independently notify the NIC, and the completion of computation for all threads of the accelerator can operate as the trigger.

One embodiment of the present invention provides a NIC that can be equipped with a host interface and triggering logic block. During operation, the host interface can couple the NIC to a host device. The triggering logic block can obtain, via the host interface from the host device, an operation associated with an accelerator of the host device. The triggering logic block can determine whether a triggering condition has been satisfied for the operation based on an indicator received from the accelerator. If the triggering condition has been satisfied, the triggering logic block can obtain a piece of data generated from the accelerator from a memory location and execute the operation using the piece of data.

In a variation on this embodiment, the memory location includes one or more of: (i) a location of a memory device of the host device, and (ii) a location of a memory device of the NIC.

In a variation on this embodiment, wherein the NIC can include counter circuitry. The triggering logic block can increment a counter value stored by the counter circuitry based on the indicator received from the accelerator.

In a further variation, the triggering logic block can determine whether the triggering condition has been satisfied by comparing the counter value with a threshold value indicated by the operation.

In a further variation, if the triggering condition has not been satisfied, the triggering logic block can insert the operation in a data structure that stores one or more operations associated with the counter circuitry.

In a further variation, the triggering logic block can receive a plurality of indicators from the accelerator and increment the counter value stored by the counter circuitry for a respective indicator.

In a variation on this embodiment, the triggering logic block can obtain the piece of data based on a direct memory access (DMA) command.

In a variation on this embodiment, the operation is generated before generating the piece of data.

In a variation on this embodiment, the triggering logic block can obtain the operation from a command queue in a memory device of the host device and store the operation in a pre-fetch queue of the network interface controller.

In a variation on this embodiment, the host interface can be a peripheral component interconnect express (PCIe) interface. The triggering logic block may receive the indicator based on a PCIe command.

Figure 2A:
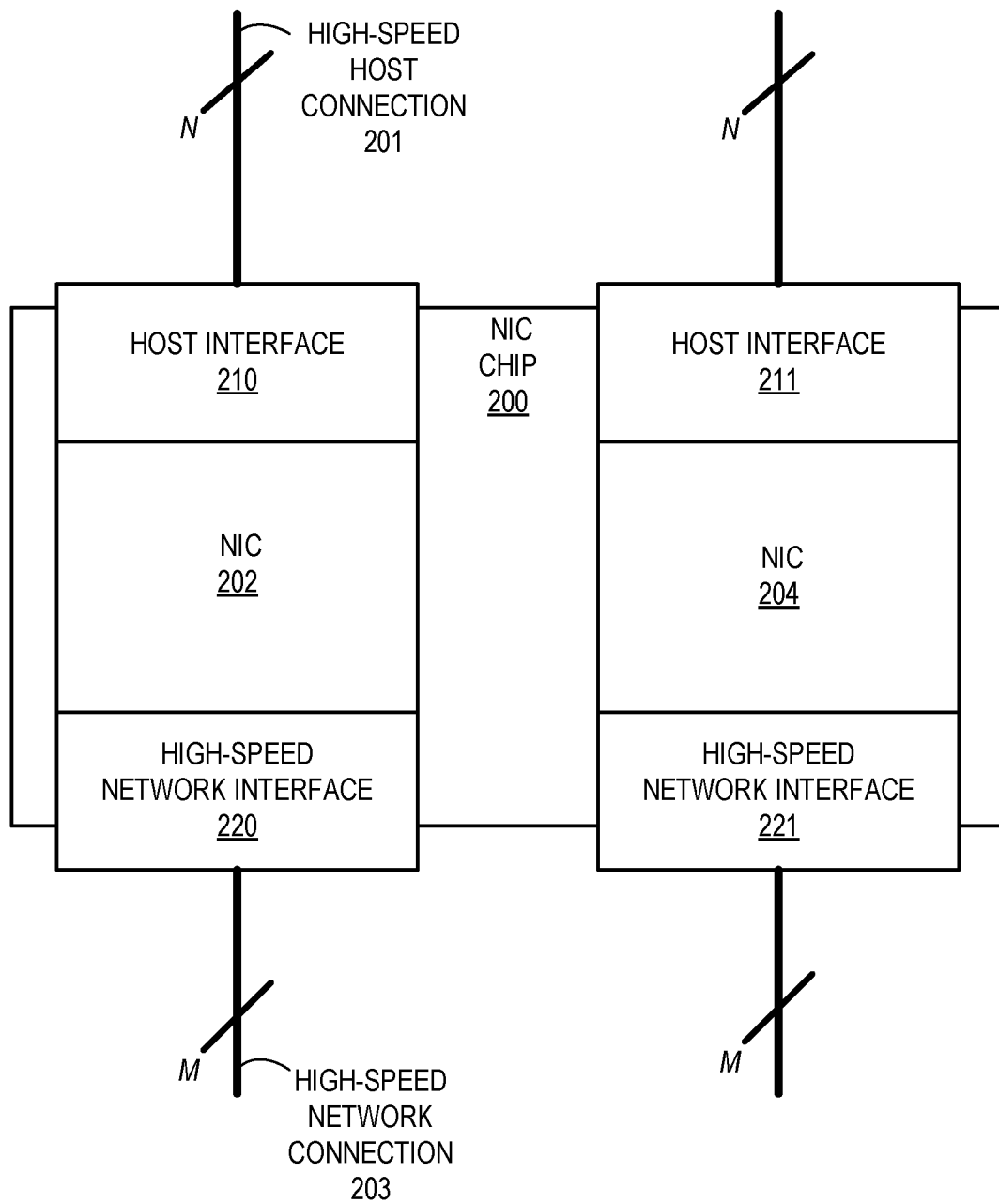
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient operation management for host accelerators.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
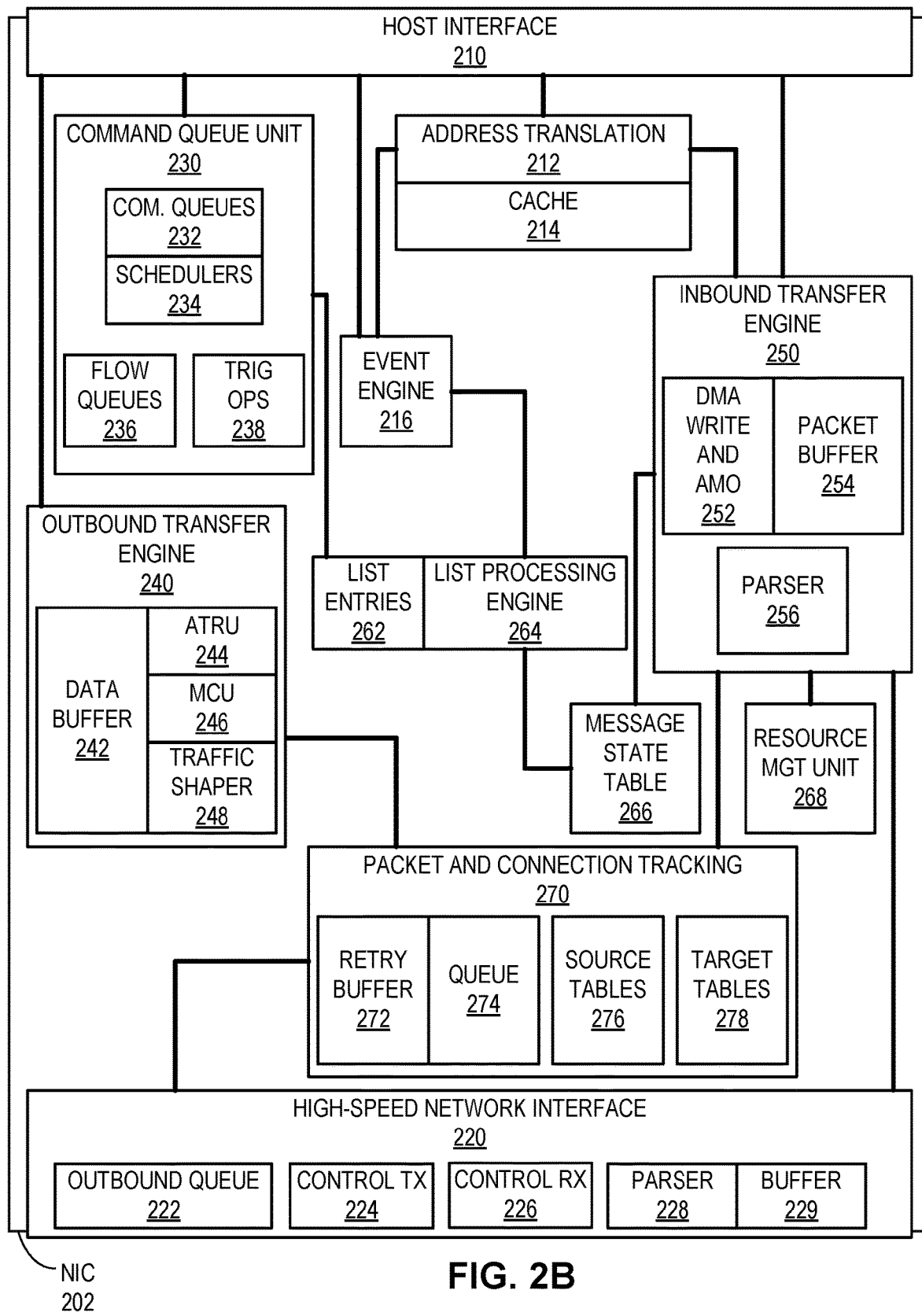
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Operation Management in NIC

Figure 3:
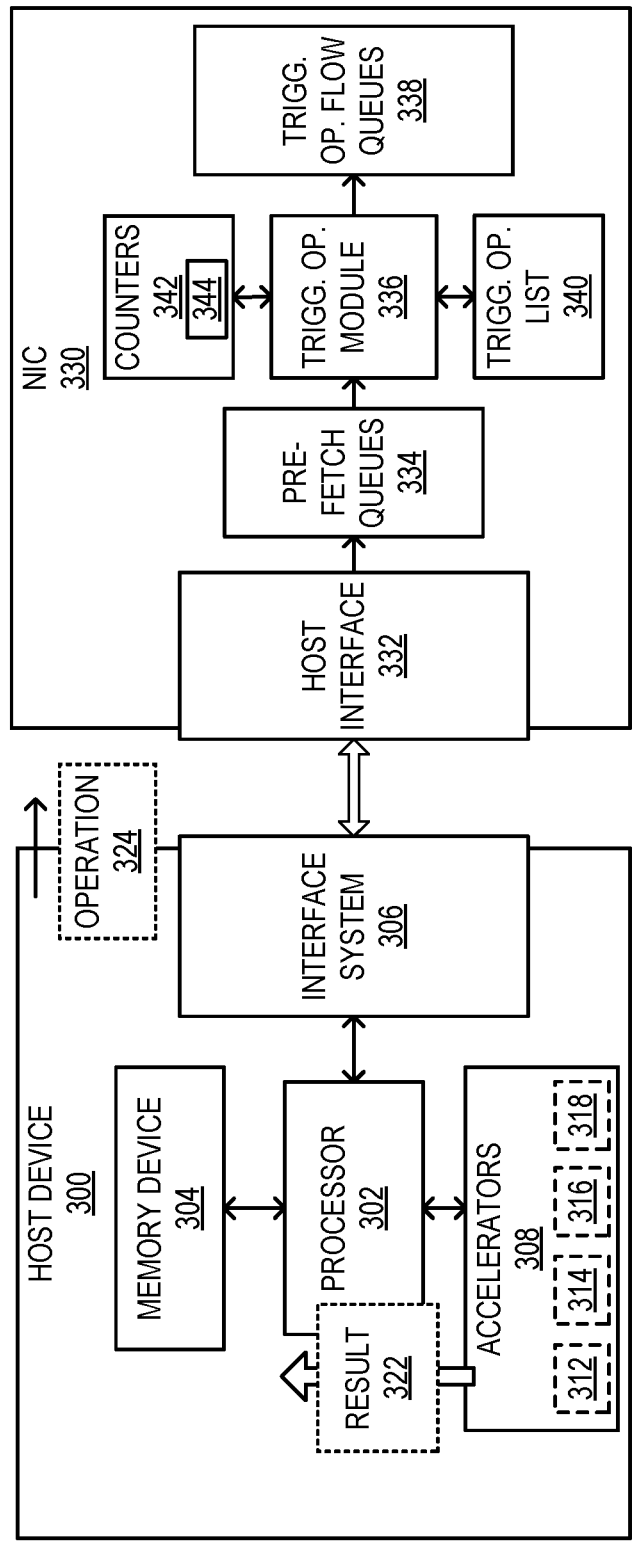
FIG. 3 shows exemplary operation management for host accelerators in a NIC.

FIG. 3 shows exemplary operation management for host accelerators in a NIC. In this example, a host device 300 can be equipped with a NIC 330. Device 300 can include a processor 302, a memory device 304, an interface system 306, and a set of accelerators 308. An HI 332 of NIC 330 can be coupled to interface system 306 of device 330. In some embodiments, HI 332 can be a PCIe interface, and interface system 306 can be a PCIe system that provides a slot for HI 332. Accelerators 308 can include a number of accelerators 312, 314, 316, and 318. An accelerator can be any processing unit that can perform extensive and specialized computations, such as a GPU or a TPU.

Typically, an application, which can operate on device 300, can issue a command that involves significant and complex computations. Device 300 may use accelerator 312 to efficiently perform such computations. However, accelerator 312 may facilitate scalar computing, which may not be well suited for running a communication stack. Furthermore, facilitating the computational results to processor 302 can be time-consuming. As a result, issuing communication operations from accelerator 312 may be inefficient and cause a delay in providing the computational results to remote devices via NIC 330.

To solve this problem, instead of accelerator 312 maintaining a communication stack, processor 302 can generate communication operations for accelerator 312 and provide the communication operations to NIC 330. To communicate with a remote device, accelerator 312 can trigger the operations at NIC 330 and can communicate without implementing a communication stack (e.g., a protocol stack). During operation, processor 302 may prepare a communication operation 324 before accelerator 312 may need to issue operation 324. Processor 302 can store operation 324 in a command queue, which can be stored in memory device 304. Since operation 324 is a pre-generated operation that can be triggered, operation 324 can be a triggered operation.

Upon completion of a set of computations, accelerator 312 may store result 322 of the computations in a predetermined location. The location can be in memory device 304 or a memory device of NIC 330. NIC 330 may pre-fetch operation 324 via HI 332 and store operation 324 in a pre-fetch queue 334 of NIC 330. Accelerator 312 can then trigger operation 324 by notifying NIC 330. In response, a triggered operation (TO) module 336 may obtain operation 324 from the command queue or pre-fetch queue 334. TO module 336 can also obtain result 322 from the predetermined location. Subsequently, TO module 336 can issue operation 324 with result 322 as a payload or a parameter. In this way, NIC 330 can facilitate efficient communication operations for accelerator 312 without requiring accelerator 312 to implement a communication stack.

The application may not need to receive an acknowledgment for individual computations. If NIC 330 can provide an acknowledgment indicating that a set of computations has been successfully completed, the application's requirement can be satisfied. NIC 330 can facilitate an event mechanism, which can be referred to as counting events, to facilitate such a cumulative acknowledgment. NIC 330 may facilitate operation 324 based on a counting event. TO module 336 can queue and activate triggered operations in NIC 330. NIC 330 can maintain a set of hardware-based counters 342 (e.g., a set of 2048 counters). Operation 324 can include a handle (e.g., a pointer or an identifier) for a counter 344 in the set of counters 342. Operation 324 can also include a threshold value. When counter 344 reaches the threshold value, TO module 336 determines that a triggering condition has been satisfied for operation 324. Accordingly, TO module 336 can trigger operation 324.

Upon obtaining operation 324 from pre-fetch queue 334, TO module 336 may determine whether operation 324 and counter 344 belong to the same resource group. If they belong to the same resource group, TO module 336 can also check whether the current value of counter 344 is greater than or equal to the threshold value. If the threshold value is greater, which is usually the case, TO module 336 can add operation 324 a list 340 of triggered operations associated with counter 344.

In some embodiments, list 340 can be sorted based on the corresponding threshold values of the operations in list 340. Each time counter 344 is incremented, TO module 336 can check whether a respective operation in list 340 has reached the threshold defined for that operation. In this way, the same counter 344 can be used to represent a plurality of operations. If the value of counter 344 reaches the threshold associated with operation 324, TO module 336 can remove operation 324 from list 340 and insert operation 324 into a corresponding flow queue in triggered operation flow queues 338. NIC 330 can schedule forwarding of operation 324 from the flow queue, as described in conjunction with FIG. 2B.

In some embodiments, accelerator 312 can issue an interface-based operation (e.g., a PCIe-based transaction) that can increment counter 344. Accelerator 312 can execute the computations by running one or more threads (or processes). Each thread may issue an interface-based command at different stages of the computation. The threads can independently increment the counter without requiring synchronization of the threads because each interface-based operation can facilitate an atomic write via HI 332. Processor 302 can provide a number of triggered operations with different thresholds for the same counter 344. This can allow different stages of the computation on accelerator 312 to trigger a corresponding communication operation.

When counter 344 reaches the threshold value of operation 324, NIC 330 can write back an indicator into the portion of memory device 304 accessible by the threads running on accelerator 312. The indicator can be the threshold value. The thread triggering operation 324 may periodically poll the write back location. Upon detecting the change at the write back location, the thread may determine that operation 324 has been completed.

Figure 4A:
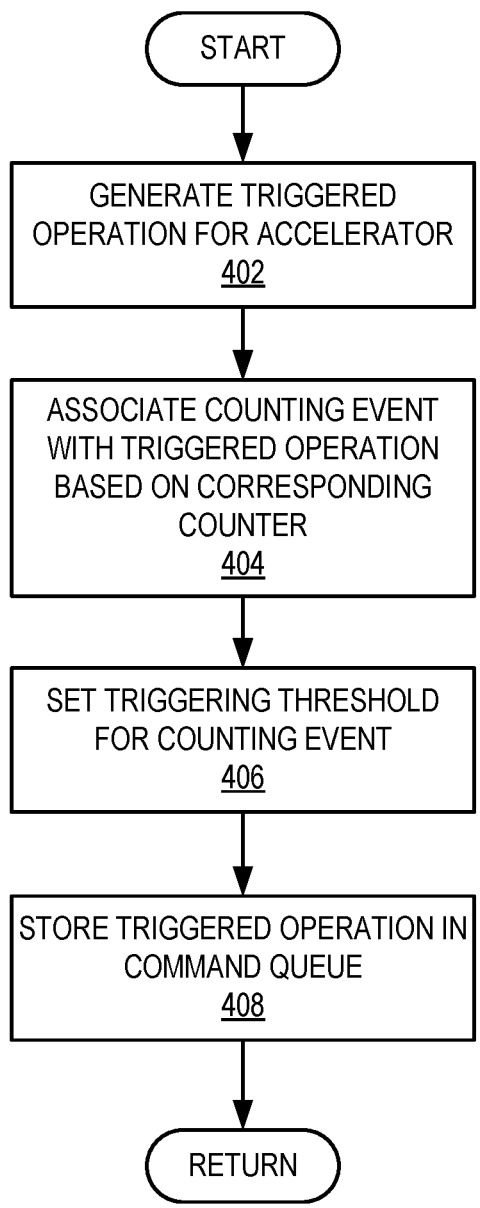
FIG. 4A shows a flow chart of a triggered operation generation process in the host device of NIC.

FIG. 4A shows a flow chart of a triggered operation generation process in the host device of NIC. During operation, the host device can generate a triggered operation for an accelerator (operation 402). The host device can then associate a counting event with the triggered operation based on a corresponding counter (operation 404). Subsequently, the host device may set a threshold level for the counting event (operation 406) and store the triggered operation in a local command queue (operation 408).

Figure 4B:
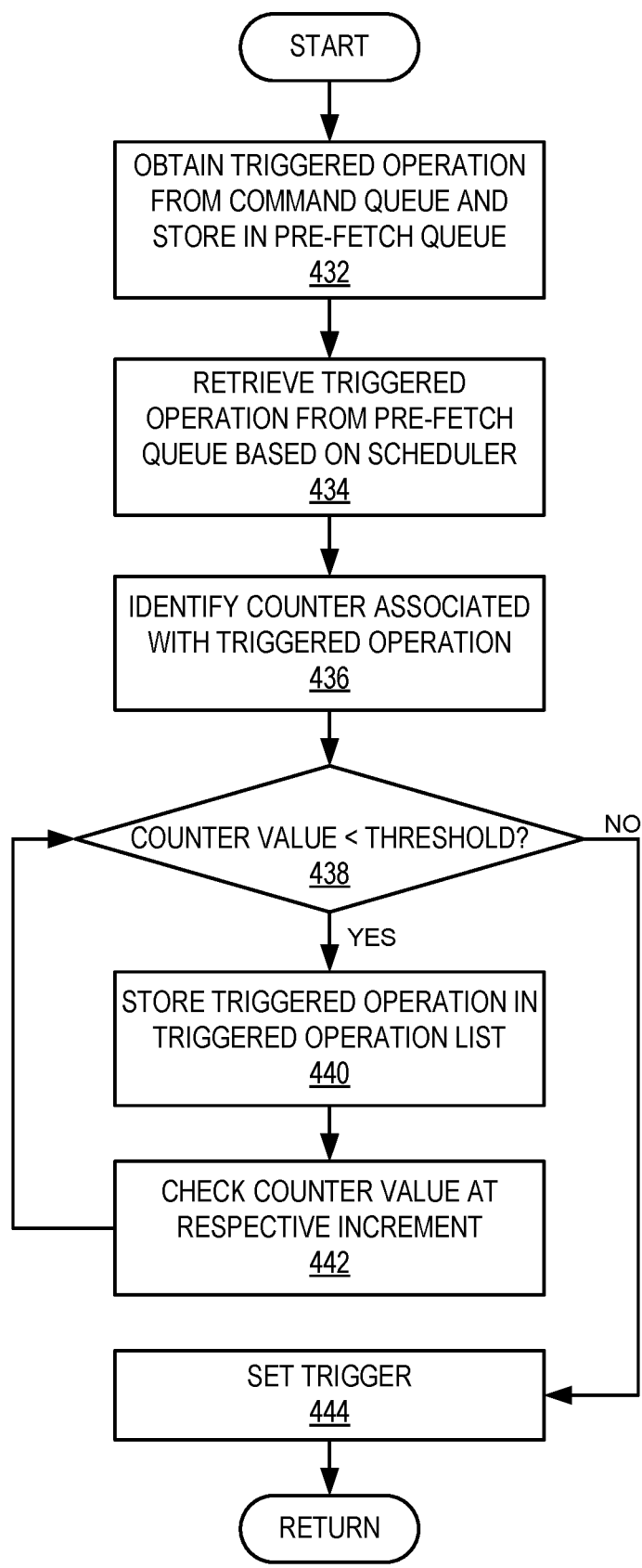
FIG. 4B shows a flow chart of a triggered operation management process in a NIC.

FIG. 4B shows a flow chart of a triggered operation management process in a NIC. During operation, a TO module of the NIC can obtain a triggered operation from the command queue and store in a pre-fetch queue of the NIC (operation 432). The TO module can then retrieve the triggered operation from the pre-fetch queue based on the scheduler (operation 434) and identify the counter associated with the triggered operation (e.g., based on the handle) (operation 436). The TO module can determine whether the counter value is less than the threshold (operation 438).

If the counter value is less than the threshold, the TO module can store the triggered operation in the triggered operation list (operation 440) and check the counter value at a respective increment (operation 442). The TO module can then continue to determine whether the counter value is less than the threshold (operation 438). On the other hand, if the counter value has reached the threshold, the TO module can set the trigger (operation 444).

Figure 4C:
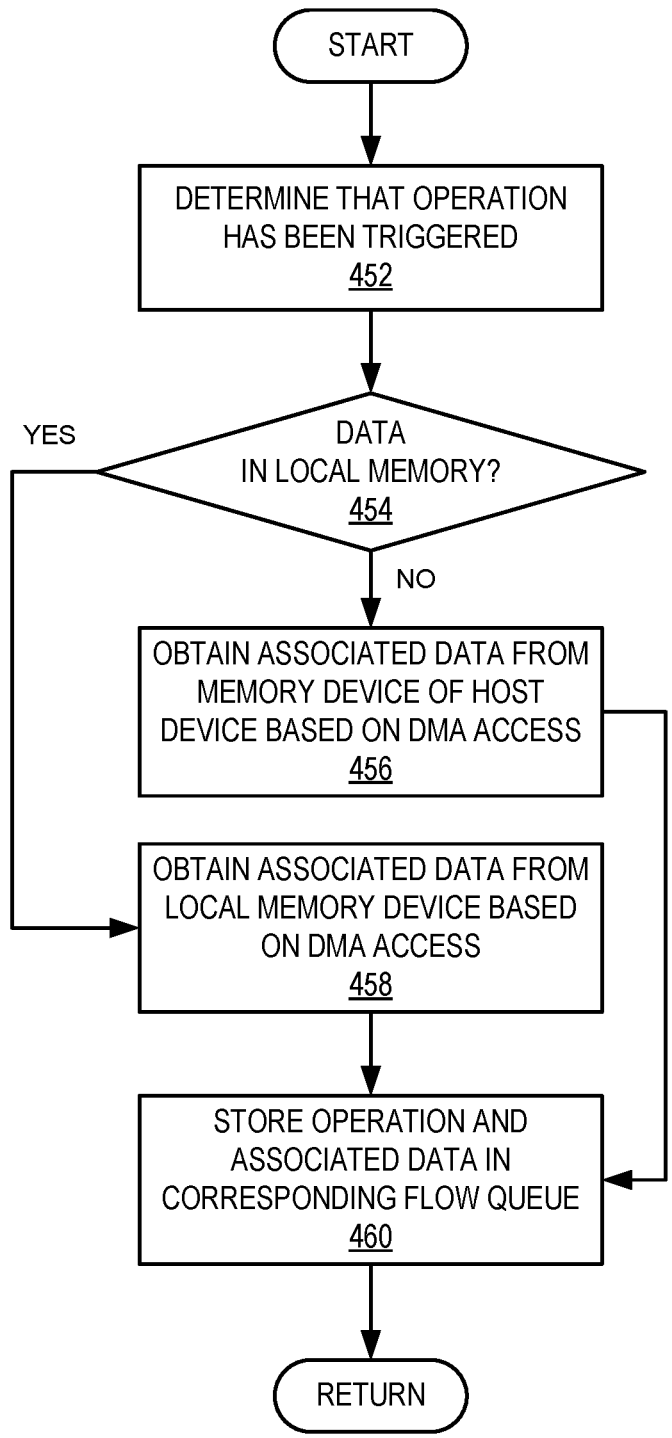
FIG. 4C shows a flow chart of a triggered operation execution process in a NIC.

FIG. 4C shows a flow chart of a triggered operation execution process in a NIC. During operation, a TO module of the NIC can determine that an operation has been triggered (operation 452). The TO module can then determine whether the corresponding data is stored in the local memory (operation 454). If the data is not stored in the local memory, the TO module can obtain the associated data from the memory device of the host device based on a DMA access (operation 456). On the other hand, if the data is stored in the local memory, the TO module can obtain the associated data from the local memory device based on a DMA access (operation 458). Upon obtaining the associated data (operation 456 or 458), the TO module can store the operation and the associated data in a corresponding flow queue (operation 460).

Exemplary Computer System

Figure 5:
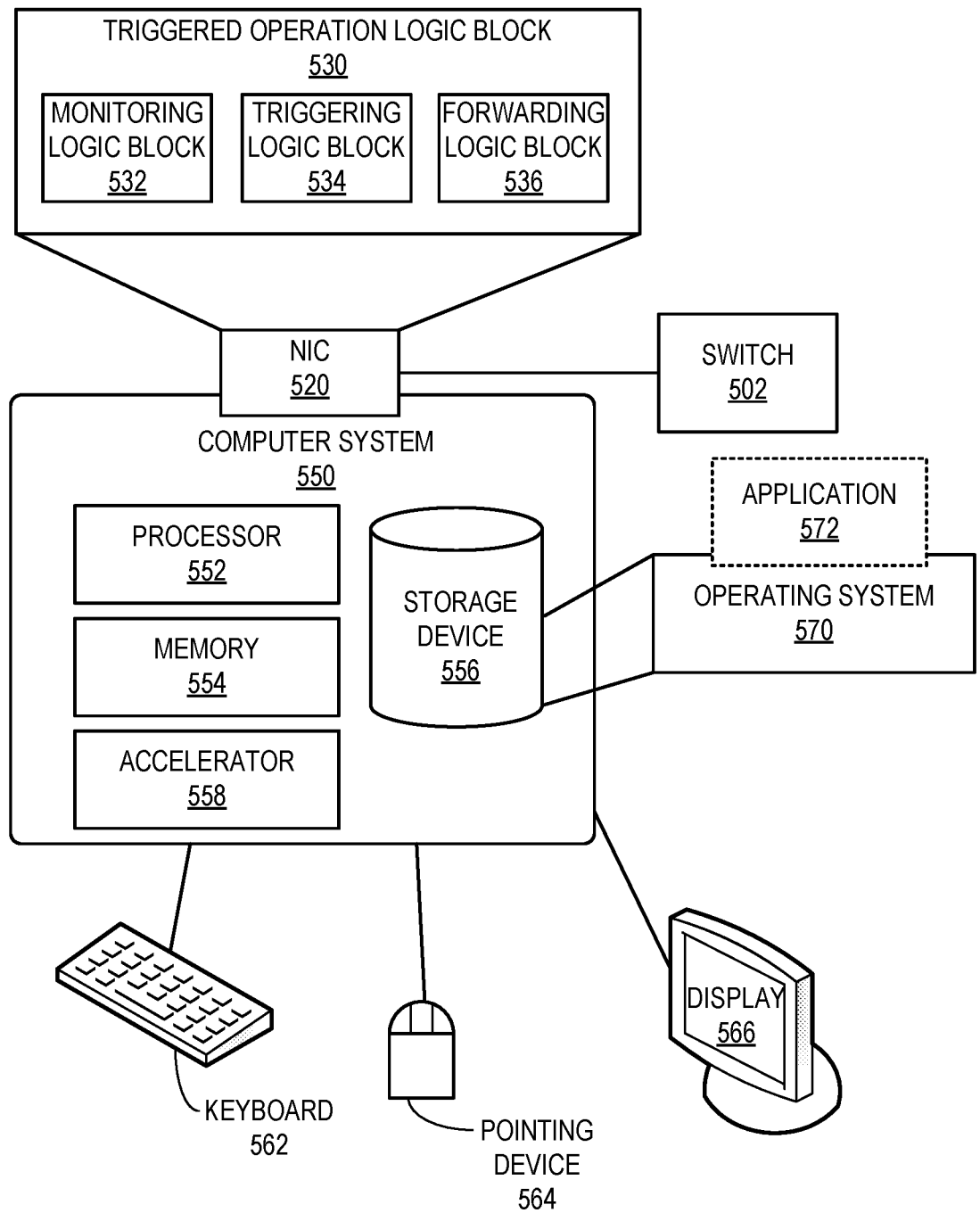
FIG. 5 shows an exemplary computer system equipped with a NIC that facilitates efficient operation management for host accelerators.

FIG. 5 shows an exemplary computer system equipped with a NIC that facilitates efficient operation management for host accelerators. Computer system 550 includes a processor 552, a memory device 554, a storage device 556, and an accelerator 558. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient operation management. NIC 520 can provide one or more HNIs to computer system 550. NIC 520 can be coupled to a switch 502 via one of the HNIs. NIC 520 can include a TO logic block 530, as described in conjunction with FIGS. 2B and 3. TO logic block 530 can include a monitoring logic block 532, a triggering logic block 534, and a forwarding logic block 536.

Monitoring logic block 532 can obtain a triggered operation from a command queue in memory device 554 and store in a pre-fetch queue of NIC 520. The triggered operation can be pre-generated by processor 552 for accelerator 558. Monitoring logic block 520 can monitor the state (e.g., a counter for a counting event) associated with the triggered operation. Accelerator 558 can change the state of the triggered operation. Triggering logic block 534 can determine whether a condition to trigger the operation has occurred based on the state (e.g., the counter has reached a threshold). If the condition has occurred, triggering logic block 534 can trigger the operation and obtain associated data from a memory location. Subsequently, forwarding logic block 536 can perform a communication operation associated with the triggered operation.

In summary, the present disclosure describes a NIC that facilitates efficient operation management for host accelerators. The NIC can be equipped with a host interface and triggering logic block. During operation, the host interface can couple the NIC to a host device. The triggering logic block can obtain, via the host interface from the host device, an operation associated with an accelerator of the host device. The triggering logic block can determine whether a triggering condition has been satisfied for the operation based on an indicator received from the accelerator. If the triggering condition has been satisfied, the triggering logic block can obtain a piece of data generated from the accelerator from a memory location and execute the operation using the piece of data.

The methods and processes described above can be performed by hardware logic blocks, modules, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
   a host interface to couple to a host device comprising a host processor and one or more accelerators;
   a pre-fetch command queue storing a plurality of communication operations, a respective communication operation being associated with an accelerator, wherein the communication operations are generated by the host processor for the accelerators; and
   a triggering logic block to, in response to determining that a triggering condition associated with the respective communication operation is met, issue the communication operation on behalf of the associated accelerator, wherein the triggering logic block is to pre-fetch the communication operations from a command queue on the host device.

2. The network interface of controller of claim 1, further comprising a counter circuitry storing a counter value, wherein the triggering logic block is to determine whether the triggering condition is met based on the counter value corresponding to the associated accelerator.

3. The network interface controller of claim 2, wherein the counter circuitry is to increment the counter value in response to receiving a command from the associated accelerator indicating completion of a process.

4. The network interface controller of claim 2, wherein the triggering logic block is to compare the counter value with a predetermined threshold value corresponding to a total number of processes executed by the associated accelerator.

5. The network interface controller of claim 1, further comprising a data structure for storing a command list, wherein the triggering logic block is to add the respective communication operation to the command list in response to determining that the triggering condition is not met.

6. The network interface controller of claim 5, further comprising a flow queue for storing outgoing communication operations, wherein the triggering logic block is to move the respective communication operation from the command list to the flow queue in response to determining that the triggering condition is met.

7. The network interface controller of claim 1, wherein the triggering logic block is to retrieve data associated with the respective communication operation from a memory location in response to determining that the triggering condition is met.

8. The network interface controller of claim 7, wherein the data is generated by the associated accelerator, and wherein the triggering logic block is to perform a direct memory access (DMA) operation to retrieve the data.

9. The network interface controller of claim 7, wherein the triggering logic block is to issue the communication operation with the retrieved data as a payload.

10. A method for facilitating efficient operation management in a network interface controller (NIC), the method comprising:
    obtaining, via a host interface coupling the NIC to a host device comprising a host processor and one or more accelerators, a communication operation associated with an accelerator;
    pre-fetching the communication operation from a command queue on the host device, the command queue storing a plurality of communication operations generated by the host processor for the accelerators;
    in response to determining that a triggering condition associated with the communication operation is met, issuing the communication operation on behalf of the associated accelerator.

11. The method of claim 10, further comprising maintaining a counter storing a counter value for each accelerator, wherein determining whether a triggering condition is met comprises comparing the counter value corresponding to the associated accelerator with a predetermined threshold value.

12. The method of claim 11, further comprising:
    incrementing the counter value in response to receiving a command from the associated accelerator indicating completion of a process.

13. The method of claim 11, wherein the predetermined threshold value corresponds to a total number of processes executed by the associated accelerator.

14. The method of claim 10, further comprising:
    in response to determining that the triggering condition is not met, adding the communication operation to a command list.

15. The method of claim 14, further comprising:
    in response to determining that the triggering condition is met, moving the communication operation from the command list to a flow queue that stores outgoing communication operations.

16. The method of claim 10, further comprising:
    in response to determining that the triggering condition is met, retrieving data associated with the communication operation from a memory location.

17. The method of claim 16, wherein the data is generated by the associated accelerator, and wherein retrieving the data comprises performing a direct memory access (DMA) operation.

18. The method of claim 16, wherein issuing the communication operation comprises using the retrieved data as a payload.

* * * * *